TRANSDUCING SYSTEM

Filed July 13, 1959 4 Sheets-Sheet 1

INVENTOR:
Wayne R. Johnson
By Smyth & Roston
Attorneys,

TRANSDUCING SYSTEM

Filed July 13, 1959 4 Sheets-Sheet 2

INVENTOR:
Wayne R. Johnson
By Smyth & Roston
Attorneys

Jan. 16, 1962 W. R. JOHNSON 3,017,457

TRANSDUCING SYSTEM

Filed July 13, 1959 4 Sheets-Sheet 3

INVENTOR:
Wayne R. Johnson
By Smyth & Roston
Attorneys

TRANSDUCING SYSTEM

Filed July 13, 1959 4 Sheets-Sheet 4

INVENTOR:
Wayne R. Johnson
By Smyth & Roston
Attorneys

United States Patent Office 3,017,457 Patented Jan. 16, 1962

3,017,457

TRANSDUCING SYSTEM

Wayne R. Johnson, Los Angeles, Calif., assignor to Minnesota Mining and Manufacturing Company, St. Paul, Minn., a corporation of Delaware Filed July 13, 1959, Ser. No. 826,500
27 Claims. (Cl. 178—6)

This invention relates to multiplex transmission systems and, more particularly, to a transmission system for multiplexing video signals representing images scanned by different television cameras.

The standard television picture in the United States is composed of 525 horizontal lines repeated 30 times a second with each of the lines having a duration of 63.5 microseconds. The scanning sequence, when viewing an image from the television camera, is from left to right along the individual horizontal lines with the lines being successively located from the top to the bottom. Each scanning frame of 525 horizontal lines includes two interlaced fields each having 262.5 horizontal lines, with the lines in each field being located at alternate vertical positions with respect to the lines in the other field.

At the end of each horizontal line, the scanning spot at the camera is returned rapidly to start the next line and, similarly, upon reaching the bottom of the picture or image, the spot is rapidly returned back to the top. During these return intervals, the scanning beam at the television camera and also at the television receiver to which the television signal is supplied, is blanked. In the United States, the standard television signal includes vertical blanking intervals which occupy between 5 to 8 percent of the total frame period or a maximum of approximately 2,700 microseconds so that the number of active viewed lines forming the picture may be only approximately 483 lines instead of 525 lines. With each frame having two interlaced fields and, therefore, two vertical blanking intervals, each of the vertical blanking intervals has a maximum duration of 1,350 microseconds, or approximately 21 horizontal lines.

The standard television signal which is transmitted includes the 483 active lines and also horizontal and vertical blanking and synchronizing pulses. The horizontal and vertical synchronizing pulses are provided, respectively, during the horizontal blanking intervals of each line, and during the vertical blanking intervals of each field. During each of the vertical blanking intervals, equalization pulses and horizontal synchronization pulses are provided in addition to the vertical synchronization pulses. The equalization pulses function to maintain synchronization even though two out of step or interlaced scanning fields are utilized, and the horizontal synchronizing pulses maintain horizontal synchronization of the receiver during the latter portion of each of the vertical blanking intervals. The vertical synchronization pulses and the equalization pulses are provided during the first portion of each vertical blanking interval, which portion may have a duration of only 558 microseconds, and the horizontal pulses are provided during the 792 microsecond remaining portion of each vertical blanking interval.

In a specific illustrative embodiment of this invention, the 792 microsecond portion or interval following the vertical synchronizing and equalization intervals during the vertical blanking period is utilized for transmitting signals representing an auxiliary television image. The composite or multiplexed transmitted signal includes the video signals for a primary image which are conventional including the equalization and synchronizing pulses in each vertical blanking interval. The multiplexed signal also includes video signals representing the auxiliary image which are provided during auxiliary transmission intervals. The auxiliary transmission interval is a phrase descriptive of the last 792 microseconds of each of the vertical blanking intervals of the video signal for the primary image.

An auxiliary television camera is synchronized with the primary camera to scan the auxiliary image during the auxiliary transmission intervals. The auxiliary image may be a printed tape or other relatively long and narrow rectangular area which is horizontally aligned with respect to scanning pattern of the auxiliary camera. The scanning pattern of the auxiliary camera is conventional being identical to that of the primary camera but out of step therewith with respect to the vertical synchronization. Twelve and a half active horizontal lines representing the auxiliary image are provied during the 792 microsecond interval for each field, or 25 lines for each auxiliary frame. The video signals from the auxiliary camera are modulated on a 3.58 megacycle sub-carrier and are multiplexed or added to the primary television signals. The modulated signals are keyed so that they are multiplexed with the primary signals only during the 792 microsecond auxiliary intervals.

At the television receiver, the multiplexed television signals are received and detected and the signals representing the two images are separated. The signals are separated by coupling them both to a gating arrangement and to a conevntional video amplifier in the television receiver. The gating arrangement is controlled by the vertical synchronizing pulses which are separated from the multiplexed signals. The vertical synchronizing pulses successively operate a multivibrator which provides output pulses having a duration equal to the auxiliary image transmission interval of 792 microseconds. The multivibrator enables the gating arrangement to provide the video signals received during the auxiliary interval to a bandpass filter which separates the modulated sub-carrier from the horizontal synchronizing pulses of the primary video signals during the auxiliary interval. The modulated sub-carrier is coupled to a demodulator and a low pass filter to recover the auxiliary signals modulated on the sub-carrier.

The auxiliary image is of a printed tape so that the transmitted information is a two-condition information in the form of letters or symbols. The demodulated signals are provided to a threshold trigger circuit which responds to signals over a predetermined magnitude to effectively sharpen the image provided at the cathode ray tube in the receiver.

The receiver includes a three-position switch to provide a visual image of either the primary image, or of the auxiliary image, or of a composite image including both. When the composite image is provided, the three-position switch is set to couple the signals from the video amplifier and from the auxiliary video channel to the cathode ray tube. The signals coupled through the video amplifier are gated during the 792 microsecond auxiliary interval so that the portion of the vertical blanking pulses normally provided at this time to the cathode ray tube are inhibited. Though a portion of each of the vertical blanking pulses is gated, the synchronizing pulses provided during this time function to maintain the receiver synchronization because they are separated from the received signals through the video amplifier. The only function therefore of the signal normally applied to the cathode ray tube during the 792 microsecond interval is to blank the tube.

The vertical deflection generator in the receiver is modified to provide for a sweep interval that is 792 microseconds longer than the conventional sweep interval for a correspondingly shorter retrace time. In this manner, the total number of active lines in the cathode ray tube is increased by 25 lines for each frame, or 12½ lines for each field. The first 25 lines at the top of the composite image provided at the receiver are of the auxiliary image with the remaining 483 being of the primary image. The ratio of the height to the width of the primary image is slightly reduced by increasing the sweep interval of the vertical deflection signals.

Other features of this invention relate to the provision of means at the television receiver for superimposing the auxiliary image on the primary image. The video signals representing the auxiliary image are coupled through a delay circuit and then added to the primary television signals before introduction to the receiver picture tube. The 25 line auxiliary image can, in this manner, be superimposed at any vertical position on the primary image at the receiver by changing the delay provided by the delay circuit.

Further features of this invention pertain to the provision of means for delaying the vertical sweep signals to shift the scanning pattern with respect to the signals representing the auxiliary image. The position of the auxiliary image may, in this manner, be readily shifted on the receiver picture tube.

Still further features of this invention relate to means for adapting a color television receiver to receive the composite television signals and to provide a primary color image and an auxiliary monochrome image on the screen of the tricolor receiving tube in accordance therewith.

Further advantages and features will become apparent upon consideration of the following description when read in conjunction with the drawing wherein.

Figure 1:
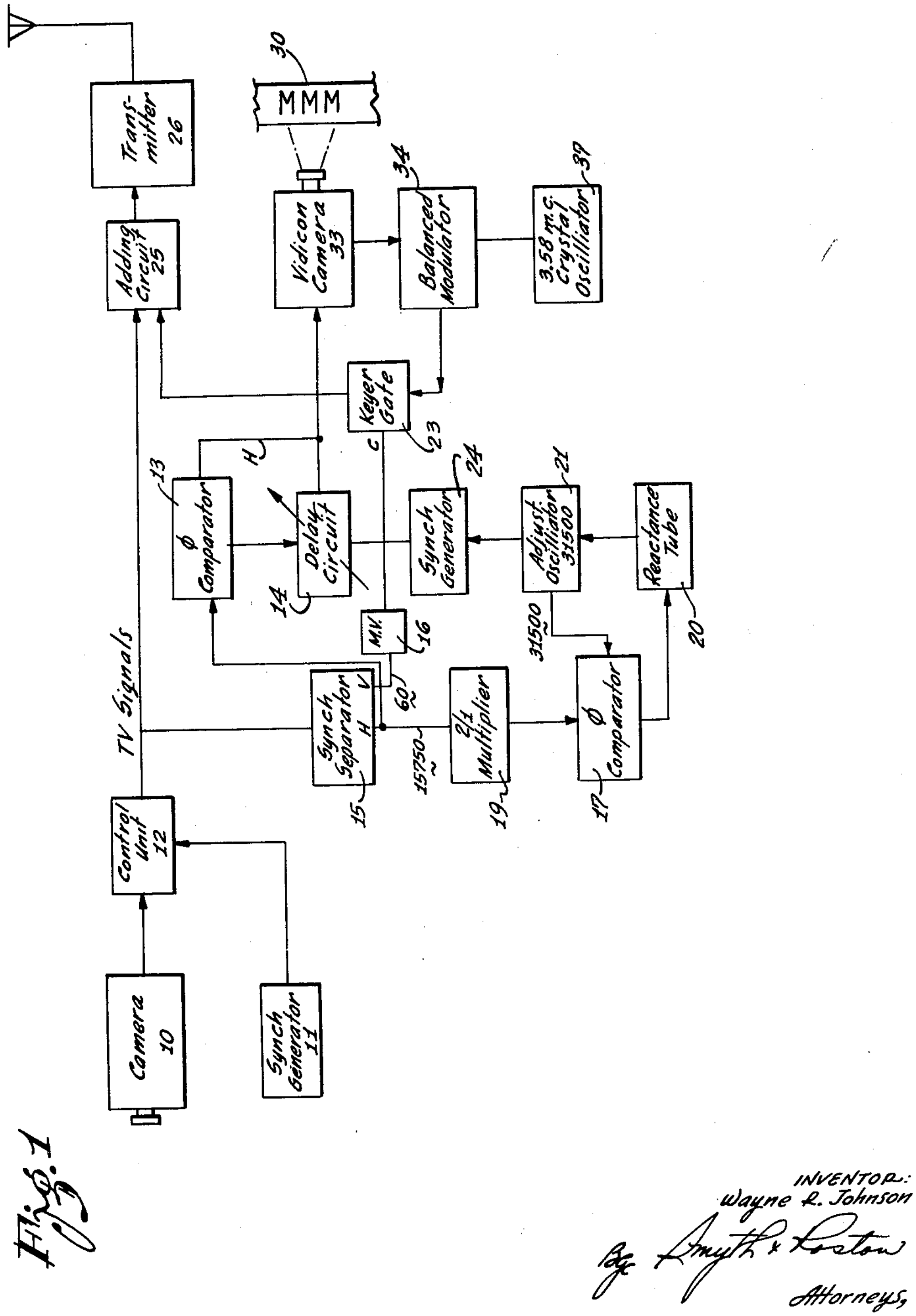
FIGURE 1 is a functional representation of the transmitting equipment of the transducer system of this invention.

Referring first to FIGURE 1, a television camera 10 is supplied with the usual scanning, blanking and synchronizing signals from a standard television synchronous generator 11. The video signals from the camera 10, which may be monochrome or color television signals, are provided through a control unit 12. The television signals from the control unit 12 include video signals representing the successive horizontal lines of a primary image scanned by the camera 10 and also synchronizing and blanking pulses. The image scanned by the camera 10 is referred to as a primary image because, as is hereinafter described, an auxiliary image which is scanned by a television camera 33 may be provided together with the primary image at a television receiver.

The horizontal synchronizing pulses at a repetition rate of 15,750 pulses per second, are separated from the signals provided from the control unit 10 by a conventional synchronizing separator 15 which supplies the separated horizontal synchronizing pulses to a multiplier 19. The multiplier 19 provides two pulses for each pulse received from the separator 15 so that the repetition rate of the pulses supplied therefrom is 31,500 pulses per second. The pulses from the multiplier 19 are provided to a phase comparator or detector 17. The comparator 17 functions to control an adjustable frequency oscillator 21 by providing an error signal to a reactance tube 20 coupled to the oscillator 21. The nominal frequency of the oscillator 21 is 31,500 pulses per second and the error signal is derived at the comparator 17 by comparing the phase of the pulses from the multiplier 19 with the phase of the pulses from the oscillator 21.

The pulses from the oscillator 21, which is synchronized in this manner by the horizontal synchronizing pulses of the primary television signal, are coupled to a synchronizing generator 24. The synchronizing generator 24, which may be similar to the synchronizing generator 11, is utilized to provide the conventional scanning, blanking and synchronizing pulses for operating the auxiliary camera 33. The signals to the camera 33 from the generator 24, however, are delayed for a predetermined interval by an adjustable delay circuit 14 so that the camera 33 is out of step with the primary camera 10. The delay circuit may include delay multivibrators, not shown, which are adjustable. The delay interval, as provided by the circuit 14, causes the camera 33 to scan a printed tape 30 during the vertical blanking interval of the primary television signals.

Both cameras 10 and 33 may be conventional, scanning their respective images at a repetition rate of 30 frames per second, with each frame including two interlaced fields of 262.5 horizontal lines. The camera 33 is synchronized with the primary television signals from the camera 10 so that it scans the tape 30 during a 12.5 line interval in each field occurring during the last portion of the vertical blanking intervals of the primary video signals.

In each field, the vertical blanking interval has a maximum duration of 1,350 microseconds. Assuming that the vertical blanking intervals have this maximum duration, and that the vertical synchronizing and equalization pulses terminate approximately 558 microseconds after the initiation of the blanking interval, the remainder of each vertical blanking interval, which has a duration of 792 microseconds (1,350 minus 558), is utilized for the auxiliary signal transmission. In the standard United States television signal the blanking interval may be somewhat shorter and the interval for the vertical synchronizing pulses somewhat longer so that the auxiliary transmission interval is shorter. The principles of the invention are the same except that the auxiliary image is provided in less horizontal lines.

Figures 3, 4:
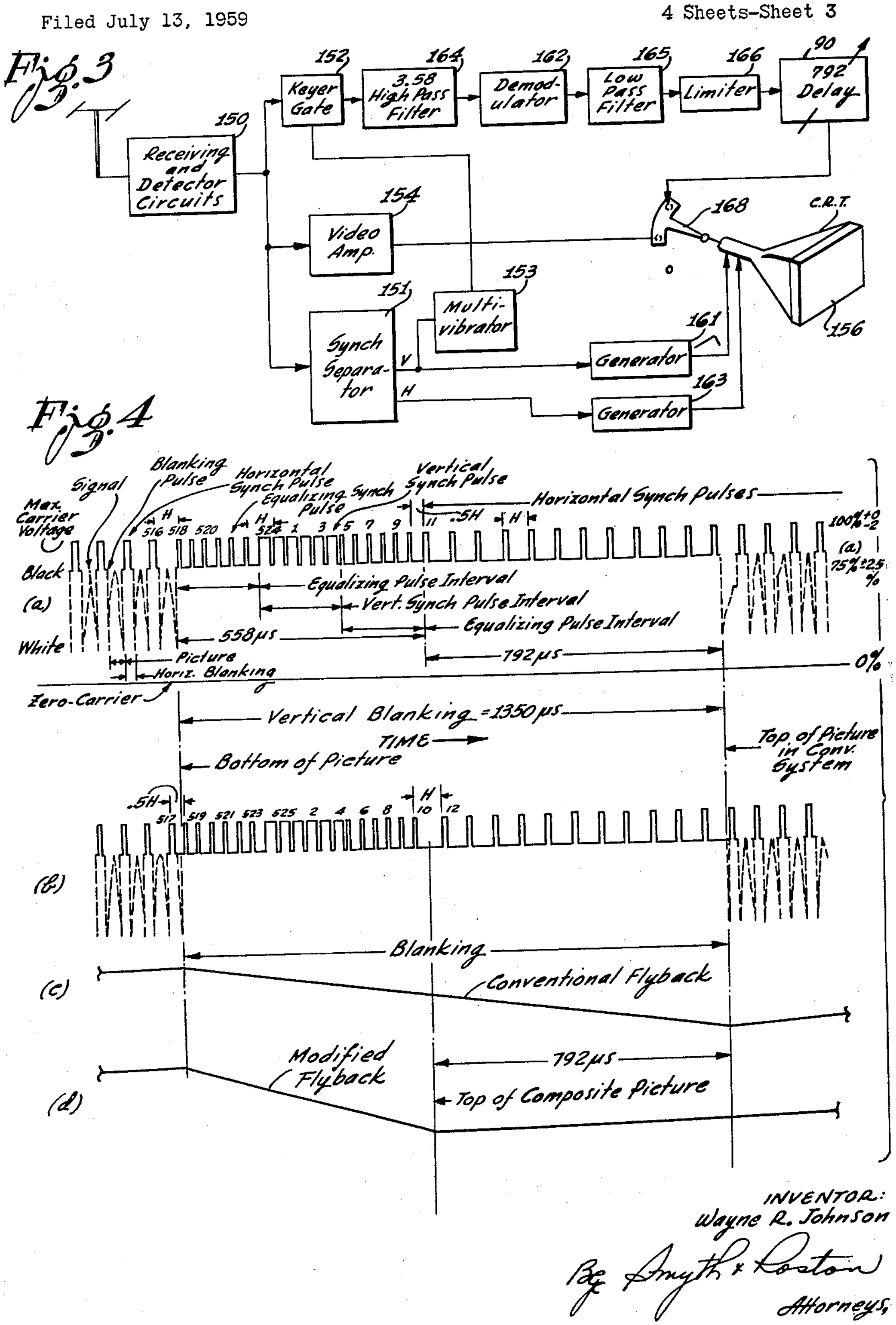
FIGURE 3 is a functional representation of a portion of a television receiver as modified in accordance with a second embodiment of the transducer system of this invention.
FIGURE 4 is a series of curves illustrating the blanking and sweep components of the television signals utilized in the embodiments of the transducer system of this invention.

FIGURE 4 illustrates the video signal provided from the control unit 12 with curves (*a*) and (*b*) depicting respectively the two successive fields of each scanning frame. In order to provide the auxiliary television signals during the 792 microsecond auxiliary intervals, the delay circuit 14 is adjusted to shift the scanning pattern of the vidicon camera 33. The delay interval provided by the circuit 14 is determined by the relative position of the tape 30 with respect to the camera 33. If the camera 33 scans the tape 30 during the last or bottom portion of its scanning pattern, the delay circuit 14 is adjusted to provide a minimum delay equivalent to approximately 21 horizontal lines whereas if the camera 33 scans the tape 30 at the beginning or the top of its scanning pattern, an approximate delay of 250 horizontal lines is provided.

Consider first that the camera 33 scans the tape 30 during the last 12.5 active lines in each field. The vertical blanking interval has a duration approximately equal to 21 horizontal lines so that by delaying or shifting the scanning pattern of the camera 33 by this amount, the auxiliary signals representing the tape 30 are provided during the last 12.5 horizontal lines of the vertical blanking interval of the primary signals. The shift interval corresponding to 21 lines is 21 times 63.5 microseconds which is 1,333.5 microseconds.

When the camera 33 scans the tape 30 at the beginning of the scanning pattern, a maximum delay equivalent to 250 lines, or 15,875 microseconds, is required in order to shift the scanning pattern so that the auxiliary television signals are provided during the auxiliary interval. The camera 33 may, in this manner, scan the tape 30 during any portion of the scanning pattern and the delay circuit 14 may be adjusted in order to shift the scanning pattern so that the auxiliary television signals representing the tape 30 are provided during the auxiliary interval of the primary television signals.

The delay circuit 14 is synchronized with the horizontal synchronizing pulses of the primary signals by a phase comparator 13. The phase comparator 13 compares the phase of the horizontal pulses from the circuit 14 to the camera 33 with the horizontal pulses from the separator 15. The comparator 13 generates an error signal in accordance with any difference in phase to adjust the delay provided by the delay circuit 14. The adjustment by the phase comparator 13 is a relatively small adjustment in order to locate the delay so that the camera 33 remains synchronized, horizontal line by horizontal line, with the camera 10. The adjustments to shift the scanning pattern of the camera 33 in accordance with the position of the tape 30 with respect to the camera 33 are relatively large in intervals equal to the horizontal line duration.

The video signals from the camera 33 are coupled to a balanced modulator 34 which modulates them on a 3.58 megacycle carrier from a crystal oscillator 37. The 3.58 modulated sub-carrier is provided with the modulator 34 through a keyer or gating circuit 23 to an adding circuit 25 which multiplexes the sub-carrier with the primary television signals.

The gating circuit 23 is controlled by a multivibrator 16 in turn controlled by the synchronizing separator 15. The vertical synchronizing pulses, which are separated from the primary television signals, are provided from the separator 15 to successively operate the multivibrator 16. The multivibrator 16 provides an output gating pulse having a duration slightly larger than 792 microseconds and commencing a few microseconds before the auxiliary transmission interval commences to enable the gating circuit 23 during the auxiliary transmission interval. The modulated 3.58 megacycle sub-carrier signal is, in this manner, coupled through the gating circuit 33 and multiplexed with the primary signal only during the auxiliary transmission interval. The multiplexed signals from the adding circuit 25 are coupled to a transmitter 26 which modulates them on a relatively high frequency carrier wave for transmission to remotely located television receivers.

Figure 2:
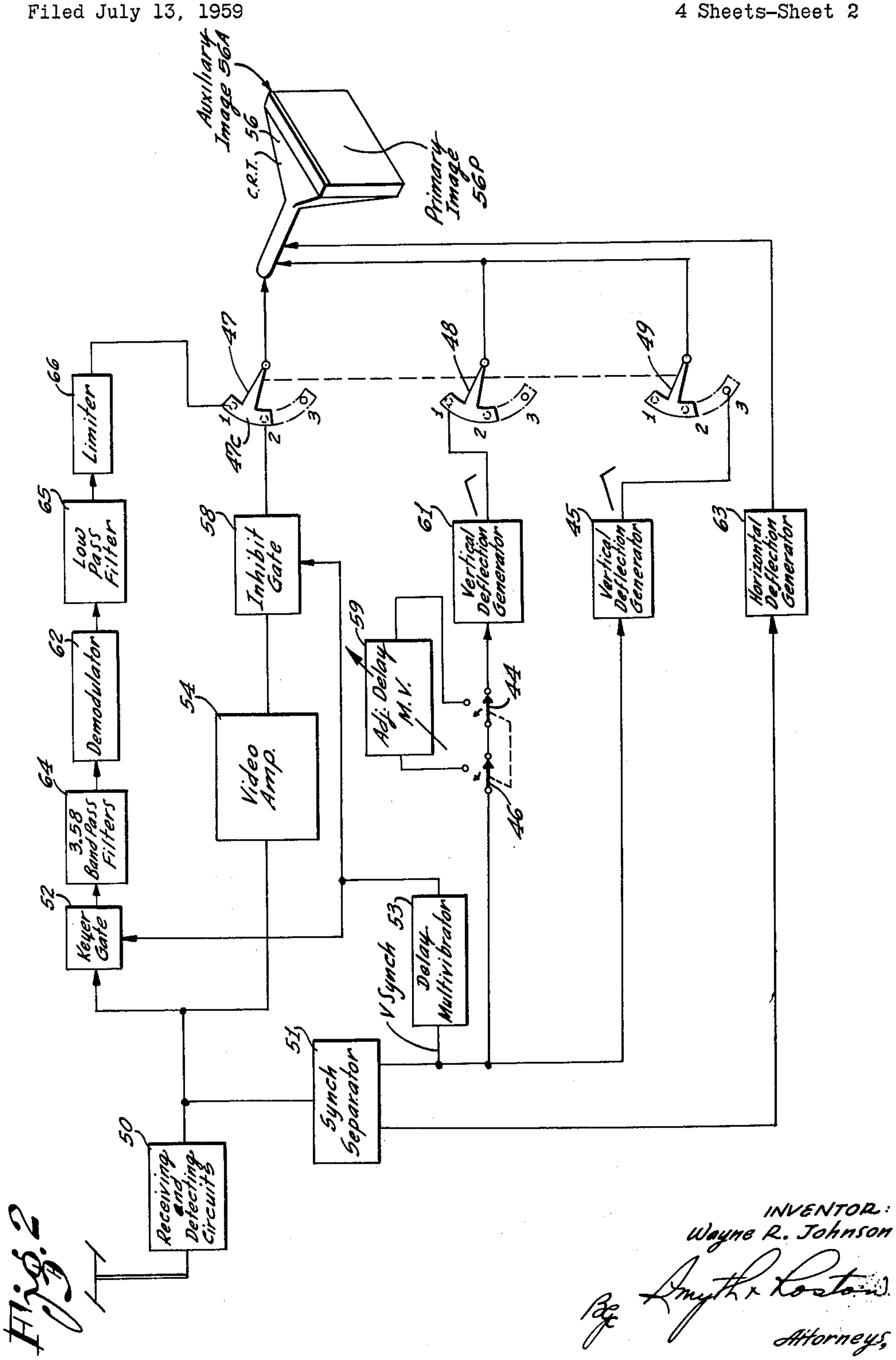
FIGURE 2 is a functional representation of a portion of a television receiver as modified in accordance with one embodiment of the transducer system of this invention.
Figure 5:
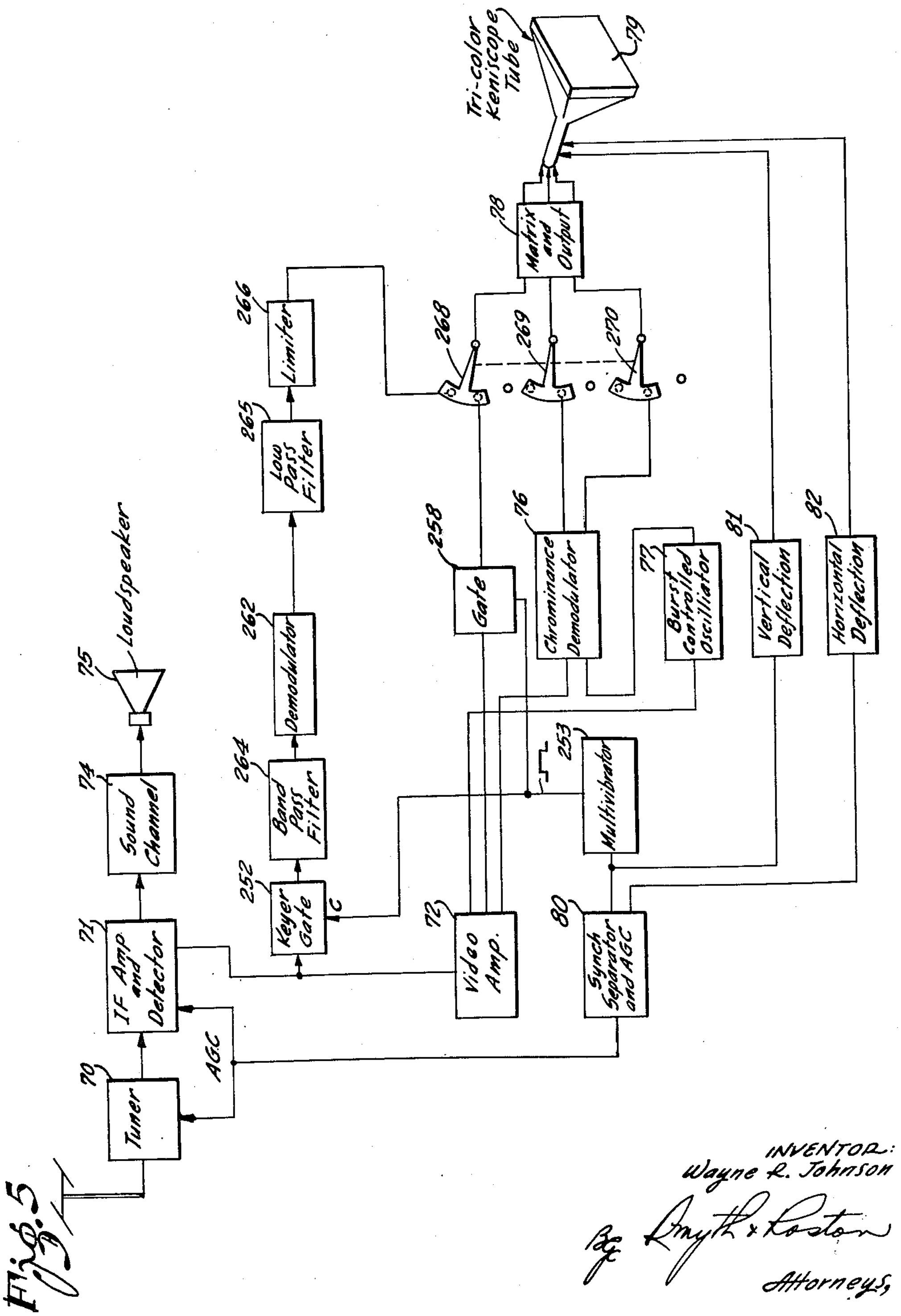
FIGURE 5 is a functional representation of a modified color television receiver which may be utilized in the transducer system of this invention.

When the multiplexed signals are received at a conventional monochrome or color television receiver, an image represented by the auxiliary signals is not provided because they are received during the vertical blanking intervals. FIGURES 2 and 3 illustrate modified monochrome television receivers for recovering the auxiliary signals as well as the primary television signals and FIGURE 5 illustrates a modified color television receiver for recovering the monochrome auxiliary image as well as the color primary image.

Referring first to FIGURE 2, the multiplexed television signals are received at the receiving and detecting circuits 50 which may be conventional. The multiplexed television signals from the circuits 50 are supplied to two parallel channels, one for the auxiliary signals and the other for the primary signals. The channel for the auxiliary signals includes a keyer or gating circuit 52 which is successively enabled by a multivibrator 53 which is, in turn, controlled by a synchronizing pulse separator 51. The separator 51, which is conventional, separates the vertical and the horizontal synchronizing pulses from the received multiplexed signals. The multivibrator 53 provides output enabling pulses having a duration somewhat in excess of 792 microseconds and commencing just before the auxiliary interval of the primary signals. The gating circuit 52 is, therefore, enabled essentially only during the auxiliary interval.

During the auxiliary interval, the multiplexed signals as provided from the circuits 50 consist of the 3.58 modulated sub-carrier and also the horizontal synchronizing pulses of the primary signals as illustrated in FIGURE 4 curves (*a*) and (*b*). The gated signals are coupled to a bandpass filter 64, which removes the horizontal synchronizing pulses of the primary signals and which passes the sub-carrier, and through a demodulator 62 which separates the modulating signals from the sub-carrier. The modulating signals, which represent the auxiliary image, are coupled through a low pass filter 65 having an upper frequency cut-off of 1.84 megacycles, which removes sub-carrier frequency components, to a limiter 66.

The video signals representing the auxiliary image are two-condition signals since the printed tape 30 scanned by the auxiliary camera 33 includes printed or two-condition illumination material. The limiter 66 is a threshold responsive circuit which provides an output only when the video signals supplied thereto exceed a predetermined amplitude level. The limiter 66, in this manner, functions to sharpen the auxiliary image to be provided at a cathode ray tube 56 in the receiver. The signals from the limiter 66 are coupled through a three-position switch 47 to the cathode ray tube 56. The switch 47 has a movable contacting member **47*c* which spans two of the three terminals 1 through 3 of the switch 47. In the position shown in FIGURE 2, the contacting member 47*c* connects the terminals 1 and 2 of the switch 47 to the cathode ray tube 56. If the member 47*c* is rotated one step in a clockwise direction, it will contact only the terminal 1, and if it is rotated in a counter-clockwise direction, it will contact the terminals 2 and 3 but not the terminal 1. The switch 47 may be set in this manner to couple the auxiliary signals together with the primary signals to the cathode ray tube 56. With the switch 47 set to connect the terminal 2 but not the terminal 1, to the tube 56, only the primary television signals are provided to the tube 56. Assuming that the switch 47 is set as indicated in FIGURE 2, both the auxiliary signals and the primary signals are coupled to the tube 56**.

When the auxiliary signals are provided to the cathode ray tube 56, the scanning pattern at the receiver is somewhat unconventional in that the vertical sweep is longer and the vertical flyback is shorter than the conventional sweep and flyback signal of the standard television signal. The vertical synchronizing pulses from the separator 51 are coupled to a vertical deflection generator 61 which provides for a deflection signal illustrated in curve (*d*) of FIGURE 4. Curve (*c*) in FIGURE 4 illustrates the conventional vertical deflection signal with the flyback or return interval being approximately equal to the vertical blanking interval of 1,350 microseconds. Actually, in the standard system, the vertical blanking interval is somewhat longer than the flyback interval but for the discussion herein it may be assumed that these intervals are equal. As shown in curve (*d*) in FIGURE 4, the flyback interval of the signal provided from the generator 61 during which the beam is vertically returned to its starting position has a duration of 558 microseconds so that the receiver cathode ray tube 56 is ready to commence its active scanning pattern at the beginning of the 792 microsecond auxiliary interval.

The vertical synchronizing pulses to the generator 61 from the separator 51 are coupled through two serially connected switches 46 and 44 which may be set to connect an adjustable delay multivibrator 59 in series with the deflection generator 61. As hereinafter described, the switches 46 and 44 are set to serially connect the multivibrator 59 when it is desired to vertically shift the position of the auxiliary image **56*a* on the face of the cathode ray tube 56. Assuming first, however, that the switches 46 and 44 are set in the manner indicated in FIGURE 2, the deflection signal from the generator 61 is coupled through a three-position switch 48 to the cathode ray tube 56. The switch 48 and a similar switch 49 may be ganged or mechanically coupled to the switch 47 described above. The switch 48 functions to couple the deflection signal from the generator 61 to the tube 56** as long as the auxiliary signals are also provided thereto.

As indicated above, the switch 47 is shown in FIGURE 2 as set to couple the primary television signals as well as the auxiliary signals to the tube 56. The multiplexed signals from the circuits 50 are coupled to a video amplifier 54 which may be similar to the video amplifier utilized in conventional receivers. The amplified video signals from the video amplifier 54 are coupled to an inhibiting gate 58 which is controlled by the multivibrator 53. As described above, the multivibrator 53 provides an output pulse having a duration slightly longer than 792 microseconds which is concurrent with the auxiliary interval. During the auxiliary interval, therefore, the multiplexed signals from the amplifier 54 are inhibited. The multiplexed signals during this interval include the horizontal synchronizing pulses which are superimposed upon a portion of the vertical blanking pulse. The gate 58, therefore, removes a portion of the vertical blanking pulse during the 792 microsecond auxiliary interval so that the auxiliary signals from the limiter 66 which are received at the tube 56 provide for the auxiliary image 56_a_. If the blanking pulse during the auxiliary interval is not inhibited, the auxiliary image is blanked.

The blanking pulse is gated after the synchronizing pulses modulating the blanking pulse have been separated at the synchronizing pulse separator 51. The synchronizing pulses arriving during the auxiliary interval are therefore effective to maintain the receiver in synchronization with the received television signals. The modulated subcarrier, which is coupled through the amplifier 54, during the auxiliary interval is also inhibited. The inhibition is, however, unnecessary for the sub-carrier at 3.58 megacycles is at the upper cut off frequency of the television bandwidth and moreover is frequency interlaced with the primary television signals. In order to frequency interlace the sub-carrier, synchronizing apparatus, not shown, associated with the multiplexing apparatus in FIGURE 1 maintains the 3.58 megacycle source 37 in synchronism with the synchronizing pulses of the primary signal.

Due to the fact that the duration of the sweep signal from the generator 61 has been increased by 792 microseconds, its slope is somewhat reduced so that the primary image 56_p_ is provided over a slightly reduced portion of the face of the cathode ray tube 56. The primary image 56_p_ includes the same number of active lines (241.5 per field) but the lines are more closely spaced. The vertical dimension of the primary image is reduced by approximately 5.2 percent of its usual height across the face of the tube 56. In each frame, therefore, the first 25 lines at the top of the received image form an auxiliary image 56_a_ and the rest of the lines form the primary image 56_p_.

If the switches 46 and 44 are operated to serially connect the multivibrator 59 with the generator 61, the scanning pattern of the cathode ray tube 56 may be adjusted or shifted to vary the position of the auxiliary image 56_a_ on the face of the cathode ray tube 56. Assume first that the switches 47, 48 and 49 are moved one step in a clockwise direction so that only the auxiliary signals are received at the cathode ray tube 56. By shifting or delaying the vertical synchronizing pulse from the separator 51, the multivibrator 59 shifts the scanning pattern with respect to the time position of the auxiliary signals. For example, if it is desired to provide the auxiliary image 56_a_ across the bottom of the face of the cathode ray tube 56 instead of across the top, the multivibrator 59 is adjusted to delay the synchronizing pulses for an interval equivalent to 21 horizontal lines (262.5–241.5). This interval of 21 horizontal lines is equal to the field duration less the duration of the primary television signals representing the primary image 56_p_ during each field.

The delay multivibrator 59 may actually consist of a delay line or combination of components not shown including a differentiating circuit for recognizing the end of the 21 interval and a second multivibrator for providing a synchronizing pulse initiated by the differentiated pulse. Such arrangements are conventional in the art so that the delay multivibrator 59 is merely illustrative. By adjusting the time position of the synchronizing pulse to the generator 61, the vertical deflection signal may be shifted so as to provide the auxiliary image across any vertical position of the tube 56.

When the switches 47 through 49 are rotated in a counterclockwise direction to contact the respective contact members of the terminals 2 and 3 so that only the primary signals are provided to the cathode ray tube 56, the switch 49 functions to couple a vertical deflection generator 45 to the cathode ray tube 56 if it is desired to project the primary picture across the full face of the cathode ray tube 56 in the vertical direction. The deflection generator 61 which provides the modified deflection signal depicted in curve (_d_) of FIGURE 4 is disconnected by the switch 48. The deflection generator 45 is conventional providing a deflection signal illustrated in curve (_c_) of FIGURE 4 which has a flyback interval of 1,350 microseconds, the duration of the conventional vertical blanking interval. The sweep voltage has a duration of 241.5 horizontal lines, the primary image field duration so that the primary image covers the entire face of the tube 56 when the auxiliary signals are not received at the tube 56. By adjusting the switches 47, 48 and 49, individual or composite images are therefore provided, and the vertical deflection voltage is automatically adjusted therewith.

In the embodiment shown in FIGURE 2, the primary and the auxiliary images are positioned adjacent to each other on the face of the cathode ray tube 56. In the embodiment of the invention illustrated in FIGURE 3, the two images may be superimposed. As shown in FIGURE 3, the multiplexed signals are received at the receiving and detecting circuits 150. The components depicted in FIGURE 3, which are similar to components described above in reference to FIGURE 2, have similar numerical designations with the addition of 100. The circuits 150, for example, are similar to the circuits 50 described above.

The multiplexed signals from the circuits 150 are provided to an auxiliary channel including a keyer or gating circuit 152 which is controlled by a multivibrator 153. The multivibrator 153 is, in turn, successively operated by the vertical synchronizing pulses from a synchronizing separator 151 to which the multiplexed signals are also provided. The keyed auxiliary signals from the circuit 152 are coupled through a 3.58 megacycle high pass filter 164 which removes the vertical blanking and the horizontal synchronizing pulses occurring during the auxiliary interval and which provides the separated subcarrier to a demodulator 162. The demodulator 162 recovers the modulating auxiliary signals and couples it through a low pass filter 165 which removes frequency components over 1.84 megacycles. The demodulated auxiliary signals are then introduced to a threshold limiter 166 which successively operates whenever the magnitude of the auxiliary signals exceeds a predetermined threshold value.

The auxiliary signals from the limiter 166 are introduced to a delay line or circuit 90 which delays them for an interval of 792 microseconds so that they commence at the beginning of the conventional television picture. The circuit 90 may, for example, include a magnetic surface and spaced recording and reading heads, none of which are shown. The distance between the heads and the speed of the surface therebetween determines the delay interval. The vertical deflection signal is conventional being illustrated in curve (_c_) of FIGURE 4, with the deflection signals being provided from a generator 161. The horizontal deflection signals are provided from a generator 163 which, together with the generator 161, is operated by the separated synchronizing pulses supplied from the separator 151. The primary signals are coupled from the circuits 150 through a conventional video amplifier 154 to the three-position switch 168. With the switch 168 in the position shown in FIGURE 3, the auxiliary television signals are multiplexed or added to the primary television signals and introduced to the cathode ray tube 156. The image provided on the cathode ray tube 156 is of the primary image with the auxiliary image being superimposed along the top 25 horizontal lines thereof.

The delay circuit 90 is adjustable so that by increasing the delay, the vertical position of the auxiliary image may be adjusted on the face of the cathode ray tube 156 and, therefore, with respect to the primary image. For delays greater than 792 microseconds, the vertical position of the auxiliary image as superimposed on the primary image is lowered.

In the embodiment shown in FIGURE 3, and in FIGURE 2 as well, television receivers are disclosed for receiving multiplexed monochrome signals. FIGURE 5 illustrates a color television receiver for providing a primary color television image and an auxiliary monochrome television image. At the transmitting end of the system, as illustrated in FIGURE 1, the camera 10 is a color television camera and the vidicon camera 33 is a monochrome television camera. The sequence of operations in the multiplexing equipment shown in FIGURE 1 is exactly the same as that described above for two monochrome television cameras. The color television signal as provided from the control unit 12 is, however, somewhat different than the monochrome television signal. Briefly, the "NTSC" color television signal, which is standard in the United States, includes a signal representative of the luminance or brightness of successive scanned points regardless of their color and also includes sidebands resulting from the modulation of two chrominance signals on two 3.58 megacycle sub-carriers. The chrominance signals contain information relating to the hues and saturation of the colors but not to their brightness. The modulated sub-carriers, which are in phase quadrature with each other, are combined to produce a single train of color signals modulated in both phase and amplitude.

At the beginning of each of the horizontal scanning lines which trace the television picture, a color synchronizing signal is supplied which includes a burst of color sub-carrier frequency. The burst of color sub-carrier frequency, which is phase advanced with respect to both the color sub-carrier frequencies, is utilized to establish the phase of an oscillator 77 in the color television receiver depicted in FIGURE 5. The signal from the oscillator 77 is resolved into orthogonal components which are employed in two separate chrominance demodulators 76 to recover the two chrominance signals. In general, the hues reproduced in the television receiver are dependent upon the phase of the sideband frequencies as compared with the phase of the periodic bursts of the reference frequency, and the intensity of the hues is dependent upon the amplitude of the sideband frequencies.

The auxiliary signals provided from the camera 33 in FIGURE 1 and modulated on the sub-carrier do not interfere in any way with the color television signals because they are synchronized line by line therewith. The auxiliary monochrome signals are provided only during the 792 microsecond auxiliary interval which occurs during the vertical blanking intervals of the color television signals.

At the color television receiver shown in FIGURE 5, the signals are received by a tuner 70 and recovered by an intermediate frequency amplifier and detector 71. The components illustrated in FIGURE 5 may all be conventional color television components except for the components in the auxiliary channel which separates the auxiliary signals from the primary color television signals. The conventional 4.5 megacycle sound sub-carrier, which is provided from the amplifier and detector 71, is coupled through a sound channel 74 to a loudspeaker 75. The video signals, which are recovered in the amplifier and detector 71, are supplied to the keyer or gate circuit 252 and to a video amplifier 72. The gate circuit 252 is controlled by a 792 microsecond multivibrator 253 in turn controlled by the sync separator 80. The gate circuit 252 is enabled by the multivibrator during the auxiliary transmission interval. The auxiliary signals coupled through the gate circuit 252 are passed through a high bandpass filter 264 to separate the modulated sub-carrier. The separated sub-carrier is demodulated in a demodulator 262 and the recovered auxiliary signal is coupled through a low pass filter 265 to a limiter 266. The limiter 266 responds to signals of predetermined threshold value and supplies output pulses through a three-position switch 268 to a conventional matrix and output circuit 78.

With the switch 268 set in the manner indicated in FIGURE 5, the auxiliary signals are coupled to the matrix and output circuit 78 as well as the primary television signals. The video amplifier 72 supplies the luminance or monochrome signals of the color television signals through a normally enabled gate circuit 258 and through the switch 268 and the circuit 78 to the tri-color kinescope 79. The circuit 78 converts the two chrominance signals and the monochrome signal to the three primary color signals for red, green and blue and supplies them to the kinescope 79.

The separated synchronizing pulses from the separator 80, which was briefly mentioned above, are supplied to the deflection circuits 81 and 82 which control the operation of the kinescope 79. The vertical deflection circuit 81 is similar to the vertical deflection circuit 61 in FIGURE 2 providing for a modified sweep signal illustrated in curve (*d*) of FIGURE 4 to the kinescope 79. The high frequency components of the composite color signal consisting mainly of the chrominance sub-carriers, are supplied from the amplifier 72 to the chrominance demodulators 76. The bursts of color sub-carrier frequency modulated on the horizontal synchronizing pulses are utilized in the chrominance demodulator 76 as indicated above to recover the chrominance signals. The color bursts are provided to the oscillator 77 to synchronize the oscillator 77 with the received color television signals. The two chrominance signals are coupled respectively through the switches 269 and 270 to the matrix and output circuit 78. In this manner, with the switches 268, 269 and 270 set to couple both the auxiliary and the primary signals to the kinescope 79, both images are provided. The auxiliary monochrome image is provided across the top of the face of the kinescope 79 and the primary color image vertically reduced by approximately 5 percent is provided across the rest of the kinescope 79. The various features described above in reference to FIGURES 2 and 3 may be included in the color television receiver as well. For example, the color television receiver may include a conventional deflection circuit, not shown, which is controlled by another three-position switch, also not shown, so as to increase the vertical dimensions of the color image on the kinescope 79 when only the color television image is to be viewed.

Although this application has been disclosed and illustrated with reference to particular applications, the principles involved are susceptible of numerous other applications which will be apparent to persons skilled in the art. For example, the auxiliary transmission interval may be initiated by the vertical synchronizing pulses so as to coincide with the equalization pulse interval as well as the last 792 microsecond interval of each blanking interval. The modulated sub-carrier would not interfere with the equalization just as it does not with the synchronization. The various delay circuits, multivibrators and deflection circuits in the receivers would of course be adjusted in accordance with the duration and initiation of the auxiliary interval. The invention is, therefore, to be limited only as indicated by the scope of the appended claims.

I claim:

1. In a system for transmitting and receiving multiplexed television signals representing a primary and an auxiliary image, first line scanning means for generating television signals representing the primary image, second line scanning means synchronized with said first line scanning means for generating television signals representing the auxiliary image during the vertical blanking intervals of the television signals representing the primary image, means coupled to said first and to said second line scanning means for multiplexing the television signals representing the auxiliary image from said second line scanning means with the television signals representing the primary image from said first scanning means, and means including a cathode ray tube coupled to said multiplexing means for receiving the multiplexed signals and for providing an image of either the said primary image or the auxiliary image at said cathode ray tube, said last mentioned means also including a first generator connectible to said cathode ray tube for providing a first predetermined deflection signal to said cathode ray tube, a second generator connectible to said cathode ray tube for providing to said cathode ray tube a second predetermined deflection signal, and switching means for connecting either said first or said second generator to said cathode ray tube to determine the respective sizes of the primary and the auxiliary images.

2. In a transmission system for multiplexed signals representing two images where the signals representing a first one of the two images has periodically recurring vertical blanking intervals and the signals representing the second one of the two images are multiplexed during the recurring blanking vertical intervals of the signals representing the first image, means for receiving the multiplexed signals, means responsive to the received signals for separating the signals representing the first image from the signals representing the second image, and means including a cathode ray tube and switching means coupled to said cathode ray tube for providing a visual representation of particular combinations of the images alone or a superimposition of the two images at particular vertical positions on the face of said cathode ray tube.

3. In a transmission system in accordance with claim 2 wherein said providing means includes means for repetitively generating a vertical deflection voltage having a sweep duration which is greater than the recurring signal transmission intervals between the vertical blanking intervals of the signals representing the first image, and means coupled to said generating means for introducing the successively generated vertical deflection voltages to said cathode ray tube to obtain representations on the face of the cathode ray tube of pictures including the second image.

4. In a television multiplexing system wherein a number of separate images are provided at a signal television receiver during each individual frame, means for generating television signals representing a first image and including synchronization signals, means coupled to said generating means for developing during each individual frame synchronizing signals which are respectively delayed with respect to the synchronization signals from said generating means so as to be out of step with the generated synchronization signals, means coupled to said developing means for generating during each individual frame television signals representing a second image which signals are out of step with the television signals representing the first image, a source of sub-carrier frequency signals, means coupled to said source and to said second image signal generating means for modulating during each individual frame the sub-carrier frequency signals from said source with the television signals representing the second image, and means coupled to said modulating means for combining during each individual frame said modulated sub-carrier signals with the television signals representing the first image.

5. In a system for transmitting and receiving primary television signals including synchronizing and blanking information occurring during periodically recurring vertical blanking periods, a source of auxiliary television signals, means for synchronizing the operation of said source with the primary television signals to obtain the generation of the auxiliary television signals during a predetermined portion of each of the recurring vertical blanking periods of the primary television signals, means for supplying a sub-carrier signal, means coupled to said supplying means for modulating the sub-carrier signal with the auxiliary television signals from said source, and keying means coupled to said modulating means for combining the modulated sub-carrier signal with the composite television signals during said predetermined portion of the primary television signals.

6. In a system for transmitting and receiving multiplexed television signals representing a primary and an auxiliary image, first line scanning means for generating television signals representing the primary image, second line scanning means synchronized with said first line scanning means for generating television signals representing the auxiliary image during the vertical blanking intervals of the television signals representing the primary image, means coupled to said first and to said second line scanning means for multiplexing the television signals representing the auxiliary image from said second line scanning means with the television signals representing the primary image from said first scanning means, and means including a cathode ray tube coupled to said multiplexing means for receiving the multiplexed signals and for providing an image of both the primary and the auxiliary images at said cathode ray for simultaneous viewing, said second line scanning means including a television camera for developing signals representing a field of view including the auxiliary image, and synchronizing means controlled by said first line scanning means and including delay means for delaying the television signals from said camera so that the portion of the television signals from said camera representing the auxiliary image is generated during the vertical blanking intervals of the signals representing the primary image.

7. In a system for receiving multiplexed television signals representing in each frame a primary image and a secondary image wherein first television signals are transmitted in each frame to represent the primary image and wherein vertical sync signals are transmitted in each frame after the transmission of the first television signals and wherein second television signals are transmitted in each frame after the vertical sync signals to represent the second image, means for receiving the first and second television signals and the vertical sync signals, visual display means for providing a visual image in accordance with the introduction of the first and second television signals to the visual display means, means responsive to the reception of the first television signals and coupled to the visual display means for obtaining an introduction of the first television signals to the visual display means, gate means responsive to the reception of the vertical sync signals for obtaining an opening of the gate means for a particular period of time at least equal to the period of transmission of the second television signals, and means responsive to the opening of the gate means and operatively coupled to the receiving means and the visual display means for obtaining an introduction of the second television signals to the visual display means.

8. The combination set forth in claim 7, including, means coupled to the visual display means and responsive to the second television signals for varying the vertical presentation of the secondary image relative to the presentation of the primary image on the visual display means.

9. In a system for receiving multiplexed television signals representing in each frame a primary image and a secondary image wherein first television signals are transmitted in each frame to represent the primary image and wherein first vertical blanking signals are transmitted to define the end of each frame for only the first television signals and wherein second television signals are transmitted in each frame at a particular time relative to the vertical blanking intervals to represent the auxiliary image and wherein second vertical blanking signals different from the first vertical blanking signals are transmitted to define the end of the frame after the first and second images, means for receiving the first and second transmitted television signals and the vertical blanking signals, means coupled to the receiving means for detecting the first television signals, means coupled to the receiving means for detecting the second television signals, means coupled to the receiving means for separating the vertical blanking signals, and means responsive to the transmission of the first and second vertical blanking signals and responsive to the detection of the first and second television signals for obtaining a visual display of particular combinations of the first and second images in accordance with the reception of particular ones of the first and second television signals and first and second vertical blanking signals.

10. In a system for receiving multiplexed television signals representing in each frame a primary image and a secondary image wherein first television signals are transmitted in each frame to represent the primary image and wherein second television signals are transmitted in each frame after the transmission of the first television signals and wherein vertical sync signals are transmitted in each frame between the first and second television signals, means for receiving the first and second television signals and the vertical sync signals, visual display means for providing a visual image in accordance with the introduction of the first and second television signals to the first and second visual display means, means responsive to the reception of the first television signals in each frame and coupled to the visual display means for obtaining the introduction of the first television signals to the vertical display means in that frame, inhibit means responsive to the reception of the vertical sync signal in each frame for preventing the subsequent introduction to the visual display means of the first television signals in that frame, and gate means responsive to the reception of the vertical sync signal in each frame for obtaining the introduction of the second television signals to the visual display means in that frame.

11. In a system for transmitting multiplexed television signals representing in each frame a primary image and a secondary image wherein first television signals are transmitted in each frame to represent the primary image and wherein vertical sync signals are transmitted in each frame after the transmission of the first television signals and wherein second television signals are transmitted in each frame after the vertical sync signals, means including a first television camera for providing the first television signals representing the first image, means for providing the vertical sync signals, means including a second television camera for providing the second television signals representing the second image, a transmitter, means coupled to the transmitter and to the first camera for obtaining a controlled introduction of the first television signals to the transmitter, and gating means responsive to the vertical sync signals for obtaining the introduction of the second television signals to the transmitter from the second camera.

12. In a system for transmitting multiplexed television signals representing in each frame a primary image and a secondary image wherein first television signals are transmitted in each frame to represent the primary image and wherein vertical sync signals are transmitted in each frame after the transmission of the first television signals and wherein second television signals are transmitted in each frame after the vertical sync signals to represent the second image, means including a first camera for providing in each frame the first television signals representing the first image for that frame, means including a second camera for providing in each frame the second signals representing the second image for that frame, means for providing the vertical sync signals defining the end of each frame, gating means responsive to the vertical sync signals in each frame for obtaining the passage of the second television signals for that frame, means responsive to the first television signals for each frame and to the second television signals passed by the gating means for that frame for combining such signals, and means responsive to the signals from the combining means for obtaining a transmission of such signals.

13. In a multiplexing system for television signals, first line scanning means for producing in each of the successive frames television signals representing a first image; second line scanning means for producing in each of successive frames television signals representing a second image; means coupled to said first and said second line scanning means for obtaining a sequential transmission in each of the successive frames of said television signals from said first line scanning means and said television signals from said second line scanning means; and a television receiver including a viewing screen for receiving the television signals from said first line scanning means and the sequentially transmitted television signals from said second line scanning means in each of the successive frames, said television receiver including means for separately recovering the television signals representing the first image and means for separately recovering the television signals representing the second image and means responsive to the recovered signals representing the first and second images and coupled to said viewing screen for providing at said viewing screen of said television receiver two substantially contiguous images representing the first and the second images.

14. In a multiplexing system in accordance with claim 7 wherein said modifying means includes synchronizing means for operating said second line scanning means during the vertical blanking intervals of the television signals from said first line scanning means, a source of sub-carrier signal, means coupled to said source and to said second line scanning means for modulating the television signals from said second line scanning means on the sub-carrier signal from said source, and means coupled to said modulating means and to said first line scanning means for adding the modulated sub-carrier from said modulating means to the television signals from said first line scanning means.

15. In a multiplexing system in accordance with claim 8 wherein said recovering means includes means for separating the synchronizing pulses from the modified television signals, an auxiliary channel including means coupled to said separating means for gating the modified television signals for passage through said auxiliary channel during a predetermined portion of each scanning cycle to recover the modulated sub-carrier signal, and means coupled to said gating means for demodulating the modulated sub-carrier to recover the television signals representing the second image; and a main channel for the modified television signals including means coupled to said separating means for interrupting the passage of television signals through said main channel during the operation of said gating means in said auxiliary channel.

16. In a system for transmitting and receiving multiplexed television signals representing a primary and an auxiliary image, first line scanning means for generating television signals representing the primary image, second line scanning means synchronized with said first line scanning means for generating television signals representing the auxiliary image during the vertical blanking intervals of the television signals representing the primary image, means coupled to said first and to said second line scanning means for multiplexing the television signals representing the auxiliary image from said second line scanning means with the television signals representing the primary image from said first scanning means, and means including a cathode ray tube coupled to said multiplexing means for receiving the multiplexed signals and for providing superimposed primary and auxiliary images at said cathode ray tube, said last mentioned means including adjustable circuit means for determining the superimposed position of the auxiliary image with respect to the primary image at said cathode ray tube.

17. In a system for transmitting and receiving multiplexed television signals representing a primary and an auxiliary image, first line scanning means for generating television signals representing the primary image, second line scanning means synchronized with said first line scanning means for generating television signals representing the auxiliary image during the vertical blanking intervals of the television signals representing the primary image, means coupled to said first and to said second line scanning means for multiplexing the television signals representing the auxiliary image from said second line scanning means with the television signals representing the primary image from said first scanning means, and a receiver for the multiplexed television signals including means for separating the television signals representing the auxiliary image from the television signals representing the primary image, a cathode ray tube for providing a visual image in accordance with television signals introduced thereto, switching means coupled to said separating means for introducing either the separated television signals representing the auxiliary image or the television signals representing the primary image to said cathode ray tube, and means coupled to said separating means and synchronized with the television signals representing the primary image for successively generating vertical deflection signals having a sweep interval which is at least as long as the combined intervals for receiving the television signals representing both the primary and the auxiliary images at said receiver.

18. In a transmission system for multiplexed signals representing two images where the signals representing a first one of the two images has periodically recurring vertical blanking intervals and the signals representing the second one of the two images are multiplexed during the recurring blanking vertical intervals of the signals representing the first image, means for receiving the multiplexed signals, means responsive to the received signals for separating the signals representing the first image from the signals representing the second image, a first channel coupled to said separating means through which are coupled the signals representing the first image, a second channel coupled to said separating means through which are coupled the signals representing the second image, means coupled to said receiving means for developing synchronizing potentials from the signals representing the first image, means coupled to said developing means for enabling said first channel and for disabling said second channel during the time the signals representing the second image are being received at said receiving means, means including a cathode ray tube coupled to said developing means and synchronously operated with the signals representing the first image under control of said developing means for providing a visible representation of signals introduced thereto at particular vertical positions dependent upon the time of introduction of such signals relative to the vertical blanking intervals, means coupled to said first channel for introducing the signals coupled through said first channel to said cathode ray tube, and means coupled to said second channel for introducing to the cathode ray tube the signals coupled through the second channel.

19. In a transmission system in accordance with claim 18 including in addition means coupled to said developing means for repetitively generating a vertical deflection voltage having a sweep duration which is greater than the recurring signal transmission intervals between the vertical blanking intervals of the signals representing the first image, and means coupled to said generating means for introducing the successively generated vertical deflection voltages to said cathode ray tube.

20. In a television transmission system, means for developing color television signals representing a first image, means for developing monochrome television signals representing a second image, means for adding said monochrome television signals to said color television signals during the blanking intervals of said color television signals, means for transmitting the two added television signals over a communication channel, means coupled to said communication channel for receiving the two added television signals, and means coupled to said receiving means for concurrently providing a monochrome image in accordance with the portion of the added signals including the television signals representing the second image and a color image in accordance with the portion of the added signals including the television signals representing the first image at said single picture tube, said providing means including means for separating the television signals representing the second image from the television signals representing the first image, and means coupled to said separating means and including a single picture tube for receiving the separated signals and for concurrently providing the monochrome and the color images.

21. In a transmission system for multiplexed signals representing two images where the signals representing a first one of the two images has periodically recurring blanking intervals and the signals representing the second one of the two images are multiplexed during the recurring blanking intervals of the signals representing the first image, means for receiving the multiplexed signals and for separating the signals representing the first image from the signals representing the second image, a first channel coupled to said separating means through which are coupled the signals representing the first image, a second channel coupled to said separating means through which are coupled the signals representing the second image, a trigger circuit in said second channel which is responsive only to signals having a magnitude exceeding a predetermined threshold so that the signals through said channel are converted to rectangular shaped pulses, a cathode ray tube coupled to said first channel and synchronously operated with the signals representing the first image for providing a visible representation of signals introduced thereto, and means coupled to said trigger circuit in said second channel for introducing the rectangular shaped pulses from said trigger circuit to said cathode ray tube during the time that said cathode ray tube is not blanked by the signals through said first channel.

22. In a system for transmitting and receiving multiplexed television signals representing a primary and an auxiliary image, first line scanning means for generating color television signals representing the primary image which signals include a modulated sub-carrier, second line scanning means synchronized with said first line scanning means for generating monochrome television signals representing the auxiliary image during the vertical blanking intervals of the television signals representing the primary image, a source of sub-carrier frequency of the same frequency as the frequency of the sub-carrier of the color television signals, means coupled to said source and to said second line scanning means for modulating the signals representing the auxiliary image from said second line scanning means on the sub-carrier frequency from said source, means coupled to said first line scanning means and to said modulating means for multiplexing the modulated sub-carrier from said modulating means with the television signals representing the primary image from said first scanning means, and means including a cathode ray tube coupled to said multiplexing means for receiving the multiplexed signals and for providing an image of either the primary image or the auxiliary image at said cathode ray tube.

23. In a system for transmitting and receiving multiplexed television signals representing a primary and an auxiliary image, first line scanning means for generating television signals representing the primary image, second line scanning means synchronized with said first line scanning means for generating television signals representing the auxiliary image during the vertical blanking intervals of the television signals representing the primary image, a source of sub-carrier frequency, means coupled to said source and to said second line scanning means for modulating the signals representing the auxiliary image from said second line scanning means on the sub-carrier frequency from said source, means coupled to said first line scanning means and to said modulating means for multiplexing the modulated sub-carrier from said modulating means with the television signals representing the primary image from said first scanning means, means including a cathode ray tube coupled to said multiplexing means for receiving the multiplexed signals and for providing an image of either the primary image or the auxiliary image at said cathode ray tube, said receiving means also including a gating circuit synchronously operated with said television signals representing the primary image for separating the modulated sub-carrier from the television signals representing the primary image, a demodulator coupled to said gating circuit for recovering the television signals representing the auxiliary image from the modulated sub-carrier frequency and for introducing the recovered television signals to said cathode ray tube, and means coupled to said cathode ray tube and synchronously operated with the television signals representing the primary image for controlling the scanning operation of said cathode ray tube so that the recovered signals representing the auxiliary image are supplied to said cathode ray tube between vertical blanking intervals at said cathode ray tube.

24. In a system for transmitting and receiving multiplexed television signals representing a primary and an auxiliary image, first line scanning means for generating television signals representing the primary image, second line scanning means synchronized with said first line scanning means for generating television signals representing the auxiliary image during the vertical blanking intervals of the television signals representing the primary image, means coupled to said first and to said second line scanning means for multiplexing the television signals representing the auxiliary image from said second line scanning means with the television signals representing the primary image from said first scanning means, means including a cathode ray tube coupled to said multiplexing means for receiving the multiplexed signals and for providing an image of either the said primary image or the auxiliary image at said cathode ray tube, said receiving and providing means also including switching means for determining which of the primary and the auxiliary images is to be provided at said cathode ray tube, and means coupled to said switching means for controlling said cathode ray tube in accordance with a first scanning pattern when the primary image is provided at said cathode ray tube and in accordance with a different scanning pattern when the auxiliary image is being provided at said cathode ray tube.

25. In a transmission system for multiplexed signals representing two images where the signals representing a first one of the two images has periodically recurring blanking intervals and the signals representing the second one of the two images are multiplexed during the recurring blanking intervals of the signals representing the first image, means for receiving the multiplexed signals and for separating the signals representing the first image from the signals representing the second image, a cathode ray tube for providing visible representations of signals introduced thereto, switching means coupled to said cathode ray tube and to said receiving and separating means for introducing either the signals representing the first image or the signals representing the second image from said receiving and separating means to said cathode ray tube, and adjustable delay means coupled to said switching means for shifting the scanning pattern of said cathode ray tube when the signals representing the second image are being introduced by said switching means to said cathode ray tube so that the position of the visible representation of the second image at said cathode ray tube is adjusted in accordance therewith.

26. In a transmission system for multiplexed signals representing two images where the signals representing a first one of the two images has periodically recurring blanking intervals and the signals representing the second one of the two images are multiplexed during the recurring blanking intervals of the signals representing the first image, means for receiving the multiplexed signals and for separating the signals representing the first image from the signals representing the second image, means coupled to said receiving and separating means for delaying the signals representing the second image for a predetermined value, and a cathode ray tube coupled to said delaying means and to said receiving and separating means for providing imposed images in accordance with the delayed signals from said delaying means and the signals representing the first image from said receiving and separating means.

27. In a transmission system for multiplexed signals representing two images where the signals representing a first one of the two images has periodically recurring blanking intervals and the signals representing the second one of the two images are multiplexed during the recurring blanking intervals of the signals representing the first image, means for receiving the multiplexed signals and for separating the signals representing the first image from the signals representing the second image, a cathode ray tube for receiving television signals and for providing a visible representation in accordance therewith, first switching means coupled to said separating means for coupling either the signals representing the first image or the second image or both of the separated signals to said cathode ray tube whereby a visible representation of either of the two images alone or a superimposition of the two images is provided at the cathode ray tube, first circuit means connectible to said cathode ray tube for repetitively generating a first deflection voltage having a sweep duration which is greater than the recurring signal transmission interval between blanking intervals of the signals representing the first image, second circuit means connectible to said cathode ray tube for repetitively generating a second deflection voltage having a sweep duration which is equal to the recurring signal transmission interval between blanking intervals of the signals representing the first interval, and second switching means electrically coupled to said cathode ray tube and mechanically coupled to said first switching means for connecting said first circuit means to said cathode ray tube when said first switching means is set to provide either the signals representing the second image or both of the separated signals to said cathode ray tube and for connecting said second circuit means to said cathode ray tube when said first switching means is set to provide only the signals representing the first image to said cathode ray tube.

References Cited in the file of this patent

UNITED STATES PATENTS

| | | |
|---|---|---|
| 2,164,297 | Bedford | Aug. 27, 1939 |
| 2,527,967 | Schrader | Oct. 31, 1950 |
| 2,635,140 | Dome | Apr. 14, 1953 |
| 2,686,220 | Sziklai | Aug. 10, 1954 |
| 2,874,213 | Beers | Feb. 17, 1959 |